Jan. 18, 1966   R. J. KOTCH ETAL   3,230,019
DRILL BIT LUBRICATOR
Filed July 5, 1963   2 Sheets-Sheet 1
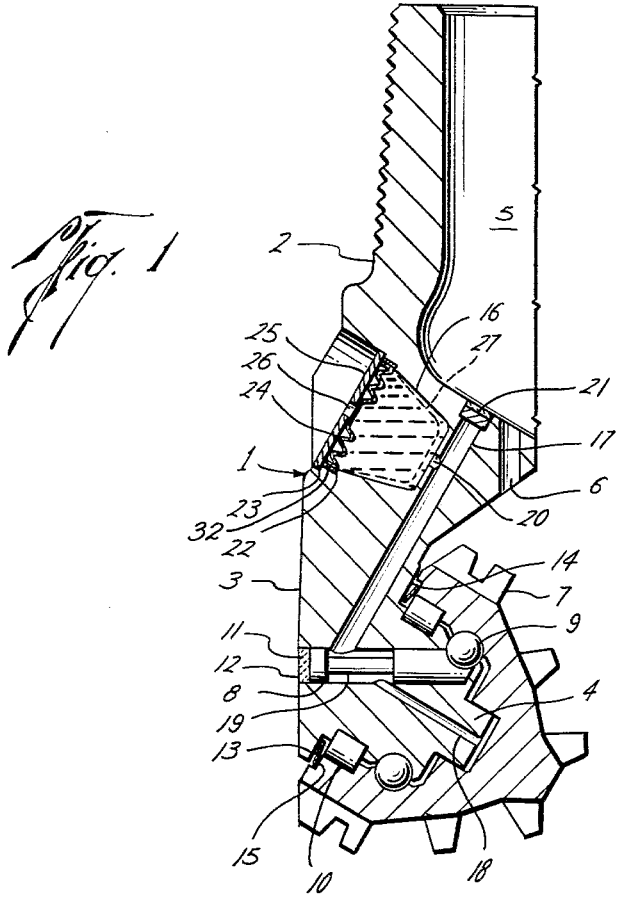
Robert J. Kotch
Percy W. Schumacher, Jr.
Clement M. Kucera
INVENTORS
BY Vincent Martin
Joe E. Edwards
M. Hardy Gay
ATTORNEYS

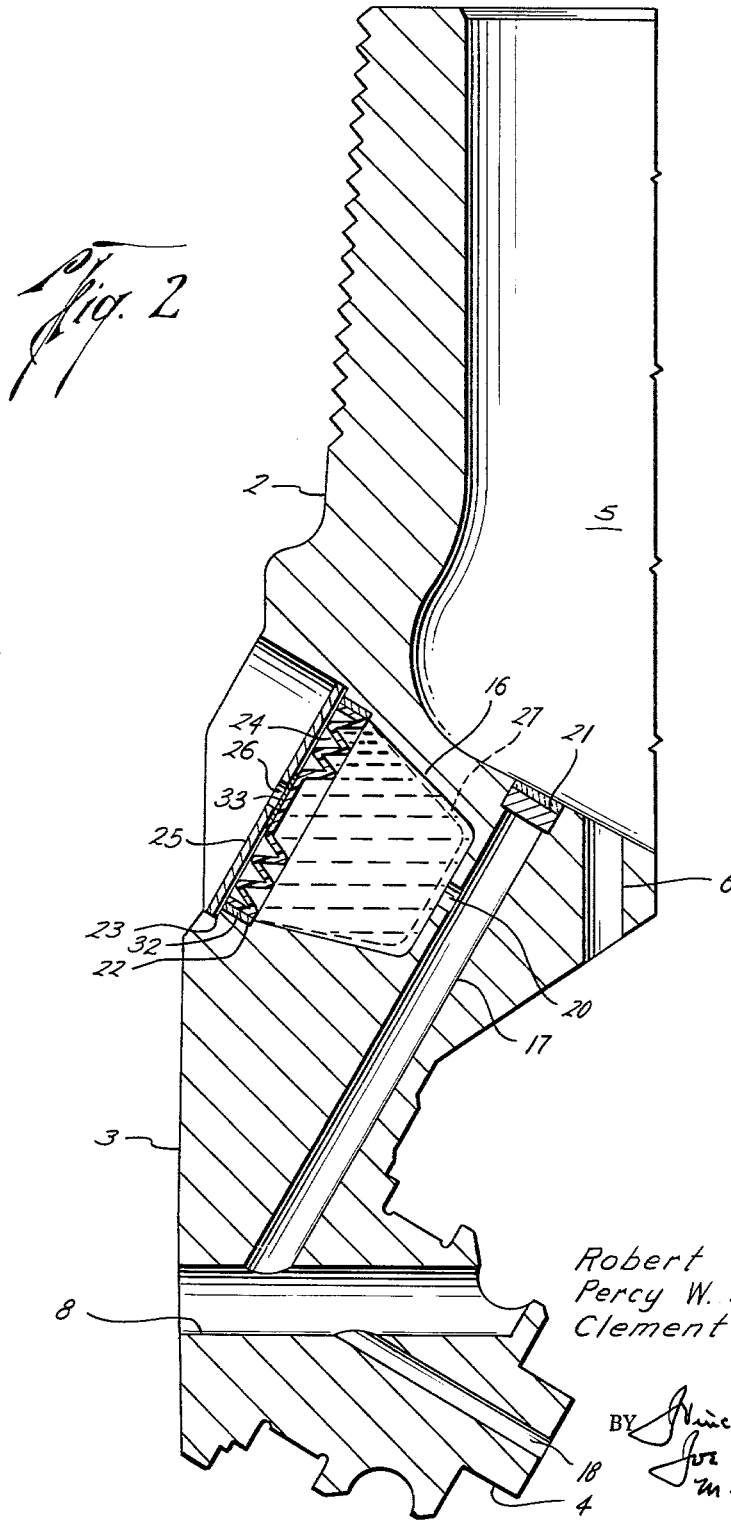

United States Patent Office 3,230,019
Patented Jan. 18, 1966

3,230,019
DRILL BIT LUBRICATOR
Robert J. Kotch, Percy W. Schumacher, Jr., and Clement M. Kucera, Houston, Tex., assignors to Reed Roller Bit Company, Houston, Tex., a corporation of Texas
Filed July 5, 1963, Ser. No. 292,910
2 Claims. (Cl. 308—8.2)

This invention relates generally to roller drill bits employed in the drilling of deep wells, and more particularly to a lubricating system therefor.

In earth boring, conditions are sometimes encountered wherein extremely abrasive surroundings subject the bearings of drill bit rollers to severe wear. Moreover the drilling fluid which is circulated downwardly through a drill stem and the drill bit may contaminate the lubricant in the bit with the result that the bearing life of the drill bit may be impaired.

It is an object of this invention to provide a new and improved lubrication system for a roller drill bit wherein the bit bearings are sealed and a lubricant reservoir is provided to supply lubricant to the bearings.

Another object is to provide a new and improved sealed bearing system for a roller drill bit which includes a lubricant rservoir arrangement which is adapted to compensate for rapid volumetric changes or fluctuations of the lubricant within the bit and reservoir during the drilling operation.

Another object is to provide a resilient diaphragm for a drill bit lubricating system wherein the diaphragm has low inertia, occupies a small space, is adapted to accommodate rapid volumetric changes within the lubricant reservoir, and is capable of extending substantially into the reservoir as the lubricant is expended therefrom.

Another object is to provide a lubricating system for a drill bit which requires few accurately machined attendant parts, and which is economical to manufacture and service.

Another object is to provide a closed lubricant system for a roller drill bit which includes a lubricant reservoir and a resilient diaphragm or closure therefor which is undulated or corrugated in cross section.

Another object is to provide a lubrication system for a roller drill bit in which large, variously shaped lubricant reservoirs may be employed without dangerously weakening the drill bit parts.

Other objects will become apparent from the following description and accompanying drawings, in which:

FIG. 1 is a sectional view through one of the cutter assemblies of a cone type bit employing the invention.

FIG. 2 is an enlarged sectional view similar to FIG. 1 but with the cutter and bearings removed.

FIG. 3 is a detail view of the diaphragm of the invention.

FIG. 4 is a sectional view taken along line 4—4 in FIG. 3.

Referring to the drawings, a drill bit 1 comprises a bit head 2 having downwardly extending legs, or bearing extensions, one of which is shown at 3. Each leg has an integral bearing shaft 4 which extends inwardly and downwardly toward the axis of the bit. The bit head 2 may have an internal chamber 5 through which drilling fluid is conducted downwardly through passageways 6 to impinge the drill bit cutters, one of which is shown at 7.

The shaft 4 has a bore 8 which extends from the exterior of the leg 3 to complemental ball bearing raceways in the cutter 7 and the shaft 4. Ball bearings 9 may be supplied to the raceways through the bore 8. The cutter 7 and the shaft 4 have complemental roller bearing raceways with roller bearings 10 in such raceways. A contoured ball retaining plug 11 may be inserted into the bore 8, and secured therein by means of a weld 12, to retain the ball bearings 9 in place, as is well known.

An annular bearing seal 13 may be disposed between a surface 14 of the bit leg 3 and an annular recess 15 in the cutter 7. The arrangement of the seal is such that when the cutter 7 is installed on the shaft 4, the seal 13 is precompressed axially to some predetermined extent.

The bit head 2 is provided with a lubricant reservoir 16 which extends inwardly from the exterior surface of said head. The head 2 has a passageway 17 drilled from the chamber 5 to the bore 8. The shaft 4 has a passageway 18 extending from the inner end thereof to the bore 8. The plug 11 has a reduced portion 19 which is arranged to be adjacent the lower end of the passageway 17 and the upper end of the passageway 18, to establish communication between such passageways. A passageway 20 extends from the inner end of the reservoir 16 to the passageway 17. The upper end of the passageway 17 may be plugged by means of a weld 21 or the like. The reservoir 16 has a first annular shoulder 22 and a second annular shoulder 23. A flexible diaphragm 24 which is undulated or corrugated in cross section is secured to a ring 32 which is disposed on the first annular shoulder 22 with its periphery in sealing engagement therewith. A retaining disc 25 is disposed on the second annular shoulder 23 in frictional engagement with the walls thereof to retain in place the ring 32. The disc 25 has a vent 26 therethrough which communicates with the exterior of the drill bit. The arrangement just described provides for communication between the lubricant reservoir 16 and the interior of the cutter 7, to supply lubricant to the interior of the cutter and to the bearings 9 and 10.

Since the diaphragm 24 and the seal 13 are exposed to the exterior of the bit, the arrangement provides for a balance of ambient pressures on the lubricator system.

The diaphragm 24 being undulated in cross section and made of a flexible material, may have relatively low inertia, and being resilient, provides resilience for the lubricator system to attenuate rapid volumetric changes or vibrations of the lubricant which may be caused by the movement of the cutter 7 and the bearings 9 and 10 on the shaft 4 during drilling operations.

Referring to FIGS. 3 and 4, the diaphragm 24 is shown comprising a flexible portion 30 which may be made of neoprene or the like. The portion 30 may have a series of corrugations or undulations 31. A ring 32, which may be made of metal is secured to the periphery of the flexible portion 30. If desired, a disc 33, which may be made of metal, may be secured at the center of the flexible portion 30 to prevent damage to the diaphragm should it be forced outwardly against the vent 26 of the retaining disc 25, and to prevent damage or puncturing of the diaphragm by reason of some sharp instrumentality being inserted through the vent 26 from the exterior of the drill bit.

During the drilling operation, as lubricant is lost from the cutter 7, usually past the seal 13, it is replenished from the reservoir 16, and the diaphragm 24 moves inwardly a compensating distance. Since the reservoir 16 and the seal 13 are exposed to the same ambient pressures, the lubricator system of the invention provides a balanced arrangement whereby reasonably uncontaminated lubricant is afforded to the rock bit cutter and bearings so long as any lubricant remains in the reservoir 16. After all of the lubricant has been expended from the reservoir 16, the diaphragm 24 will be in the position shown by the dotted lines at 27. Thus, while the diaphragm extends substantially normally across the reservoir 16 when the reservoir is full of lubricant, the undulations provide sufficient flexibility for movement of the diaphragm inwardly toward the position shown at 27, thus affording a large lubricant reservoir for a rock bit wherein the system is closed or isolated from the ambient drilling fluid, and wherein no piston is necessary to follow the lubricant as it is used from the reservoir. Because of the flexibility of the undulated diaphragm, lubricant reservoirs of various configurations may be employed in the bit head 2. Such a lubricant system may afford a large lubricant reservoir without dangerously weakening the structure of a drill bit, and also provides a lubricating system for a drill bit wherein tolerances do not have to be held closely for the parts therein employed. Further, it provides a system that is easily serviced or repaired.

Moreover the diaphragm 24, being in effect retracted or folded within itself, occupies only a small volume of the reservoir 16 when the reservoir is full of lubricant, yet it is adapted to extend substantially completely into reservoirs of various shapes and sizes as lubricant is used therefrom, so that substantially all of the lubricant is effectively utilized to lubricate the interior of the cutter 7 and the bearings therein.

This invention is not limited to the embodiment shown. Various changes within the scope of the following claims will occur to those skilled in the art.

What is claimed is:

1. A rock bit having a depending leg and a bearing shaft thereon, a roller cutter mounted on said shaft, anti-friction bearings disposed between said shaft and said cutter, a seal between the cutter and the shaft, the said depending leg having a lubricant reservoir therein, means forming a passageway communicating between the lower end of said lubricant reservoir and the interior of said cutter, a diaphragm the periphery of which is secured to a ring and which is supported on a shoulder in said reservoir, said ring being held in place by a disc having a vent therethrough and communicating with the exterior of said bit and frictionally fitted in said reservoir to hold said ring against said shoulder, said diaphragm having a series of undulations across its breadth which permit the inner undulations to extend under pressure of the fluid outside of said reservoir whereby to force the lubricant to the interior of said cutter.

2. A rock bit having a depending leg and a bearing shaft thereon, a roller cutter mounted on said shaft, anti-friction bearings disposed between said shaft and said cutter, a seal between the cutter and the shaft, the said depending leg having a lubricant reservoir therein, means forming a passageway communicating between the lower end of said lubricant reservoir and the interior of said cutter, a diaphragm the periphery of which is secured to a ring and which is supported on a shoulder in said reservoir, said ring being held in place by a disc having a vent therethrough and communicating with the exterior of said bit and fitted in said reservoir to hold said ring against said shoulder, said diaphragm having a series of undulations across its breadth which permit the inner undulations to extend under pressure of the fluid outside of said reservoir whereby to force the lubricant to the interior of said cutter.

References Cited by the Examiner
UNITED STATES PATENTS

| | | | |
|---|---|---|---|
| 2,985,256 | 5/1961 | Simmons | 184—65 |
| 3,007,751 | 11/1961 | Eenink | 175—227 X |
| 3,096,835 | 7/1963 | Neilson | 175—228 |

JACOB L. NACKENOFF, *Primary Examiner.*

BENJAMIN BENDETT, *Examiner.*

W. J. MALONEY, *Assistant Examiner.*